(12) United States Patent
Lloyd

(10) Patent No.: US 7,657,329 B1
(45) Date of Patent: Feb. 2, 2010

(54) EMBEDDING HMI LOGIC INTO CONTROL LOGIC

(75) Inventor: Robert F. Lloyd, Muskego, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 291 days.

(21) Appl. No.: 11/467,818

(22) Filed: Aug. 28, 2006

(51) Int. Cl.
*G05B 11/01* (2006.01)
*G05B 19/05* (2006.01)

(52) U.S. Cl. ............................. 700/17; 700/18; 700/83

(58) Field of Classification Search ................ 700/17, 700/83, 86, 87, 18; 715/762
See application file for complete search history.

(56) References Cited

U.S. PATENT DOCUMENTS

| | | | |
|---|---|---|---|
| 6,268,853 B1 | 7/2001 | Hoskins et al. | |
| 6,839,600 B2 | 1/2005 | Spenser et al. | |
| 6,854,111 B1* | 2/2005 | Havner et al. | 700/17 |
| 2003/0041051 A1 | 2/2003 | Spenser et al. | |
| 2004/0098148 A1 | 5/2004 | Retlich et al. | |
| 2006/0015195 A1* | 1/2006 | Lehman et al. | 700/83 |
| 2006/0095855 A1 | 5/2006 | Britt et al. | |

OTHER PUBLICATIONS

Eurotherm LTD. "Visual Supervisor User Guide & Tutorial HA027504U005 Issue 2". Nov. 2002. 33 pages.
European Search Report dated Dec. 3, 2007 for European Patent Application Serial No. 07016845.5-2206. 2 Pages.

* cited by examiner

*Primary Examiner*—Albert DeCady
*Assistant Examiner*—Steven R Garland
(74) *Attorney, Agent, or Firm*—Turocy & Watson LLP; Alexander R. Kuszewski

(57) ABSTRACT

A system for utilization with a logic controller comprises an interface component that receives a request to embed human-machine interface (HMI) logic into control logic. Thereafter, an embedder component executes the request and embeds the HMI logic into the control logic. In an example, the control logic can be ladder logic, and the logic controller can be a combined controller/HMI device.

17 Claims, 14 Drawing Sheets

EMBEDDING HMI LOGIC INTO CONTROL LOGIC

TECHNICAL FIELD

The claimed subject matter relates generally to system control, and, more particularly, to enabling HMI logic to be integrated directly with control logic.

BACKGROUND

Due to advances in computing technology, businesses today are able to operate more efficiently when compared to substantially similar businesses only a few years ago. For example, high speed data networks enable employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, activities that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases (or web services referencing databases) that are accessible by system/process/project managers on a factory floor. For example, sensors and associated software can detect a number of instances that a particular machine has completed an operation given a defined amount of time. Further, data from sensors can be delivered to a processing unit related to system alarms. Thus, a factory automation system can review collected data and automatically and/or semi-automatically schedule maintenance of a device, replacement of a device, and other various procedures that relate to automating a process.

To quickly and easily effectuate control of a system or process within industrial automation environments, equipment manufacturers typically create specialized human-machine interfaces (HMIs) that are employed by operators to deliver commands to industrial systems/processes and/or receive data from industrial systems/processes. In other words, HMIs provide an essential communication link between operators and automation devices, wherein such HMIs enable operators to, among other things, implement and control devices and receive feedback by monitoring device status and health during operation. Without these interfaces, high-level industrial automation would be difficult if not impossible to achieve.

Over time, HMIs have undergone several and drastic changes. For instance, a push-button that commissions and de-commissions a machine is a simplest form of a HMI, and these interfaces have been existent for several years. Terminals were later designed that displayed text messages to end users, wherein such messages are indicative of a process performed by a server or processor associated with an automation device. For example, a failed device can generate an internal error code representing a determined error which can then be matched with a particular error message. This message can thereafter be displayed to an operator on a display device. Development of client-side processing has enabled graphical depictions of status and control commands to operators, which has shifted a burden from an automated device or associated processor to a client-side graphical user interface. These graphical user interfaces improve an ability of users to access information quickly and easily.

Today's HMIs typically include several devices, which can be push-buttons or other suitable devices, which can operate together to effectuate control over a process, indicate status of a process, and/or the like. Interfacing these devices with control process, however, is a complex and mistake-prone process. In more detail, HMIs are conventionally separated logically from controllers, such that interfacing an HMI and a logic controller requires use of a "tag database." In other words, to enable interaction between an HMI device and a logic controller, an intermediate tag or memory location is utilized, such that an HMI device reads and writes to the memory location and a controller responds to changes to data to such location. The HMI device has no concept or association of how data associated with the memory location is being employed, and the logic controller has no knowledge with respect to an interface or device generating data. Thus, a significant amount of time is required to define and test intermediate tags that act as holding places for communicating an interface associated with the device between such device and the controller. Furthermore, inefficiencies result, as the control logic must constantly monitor tag locations for alterations in data to ensure that an industrial process is being properly controlled.

SUMMARY

The following presents a simplified summary of subject matter described in more detail herein in order to provide a basic understanding of some aspects of such subject matter. This summary is not an extensive overview, and is not intended to identify key/critical elements or to delineate the scope of the subject matter described herein. Its sole purpose is to present some concepts in a simplified form as a prelude to the more detailed description that is presented later.

Described herein are systems and methods that relate to enabling HMI logic to be embedded directly within control logic, thereby eliminating a need for maintaining a database that describes memory locations in order to interface HMI logic and control logic. For example, HMI logic that is representative of a push-button and/or the like can be embedded directly within control logic, such as ladder logic. This logic can then be compiled and executed by a logic controller, a combined controller/HMI device (CHMI), or other suitable industrial automation device. In another example, logic components can be merged with HMI functions. For instance, a counter function can be merged with the display of a counter value in an HMI application. Thus, new types of HMI devices can be defined that encompass both traditional control and user interface aspects.

Additionally, logic can be quickly and easily copied for dissemination amongst a plurality of logic controllers, as tags do not need to be defined for each controller. For instance, HMI logic can be made available to a plurality of programmers within a library that is accessible by way of a network (e.g., an intranet). Thus, programmers can add HMI logic to the library and request HMI logic from the library. For instance, HMI logic can be made available by Original Equipment Manufacturers and sold over the Internet to purchasers (e.g., programmers). This HMI logic can be primitive in nature and then edited by the programmers to enable desired functionality. The editing can include wiring up the HMI logic to other logic, including control logic and HMI logic.

Additionally, control logic with HMI logic embedded therein can be executed within a data driven architecture. In more detail, events can occur that cause certain logic (control logic and/or HMI logic) to react. If logic executes out of a certain order, however, undesirable results, such as infinite loops, race conditions, and/or the like can occur. Thus, HMI logic and control logic can be sequenced such that such executes in an appropriate order. Such sequencing can be determined based upon a manner in which logic is wired up with respect to other logic.

To the accomplishment of the foregoing and related ends, certain illustrative aspects of the claimed subject matter are described herein in connection with the following description and the annexed drawings. These aspects are indicative, however, of but a few of the various ways in which the principles of the claimed subject matter can be employed and such subject matter is intended to include all such aspects and their equivalents. Other advantages and novel features will become apparent from the following detailed description of the invention when considered in conjunction with the drawings.

DETAILED DESCRIPTION

Figure 1:
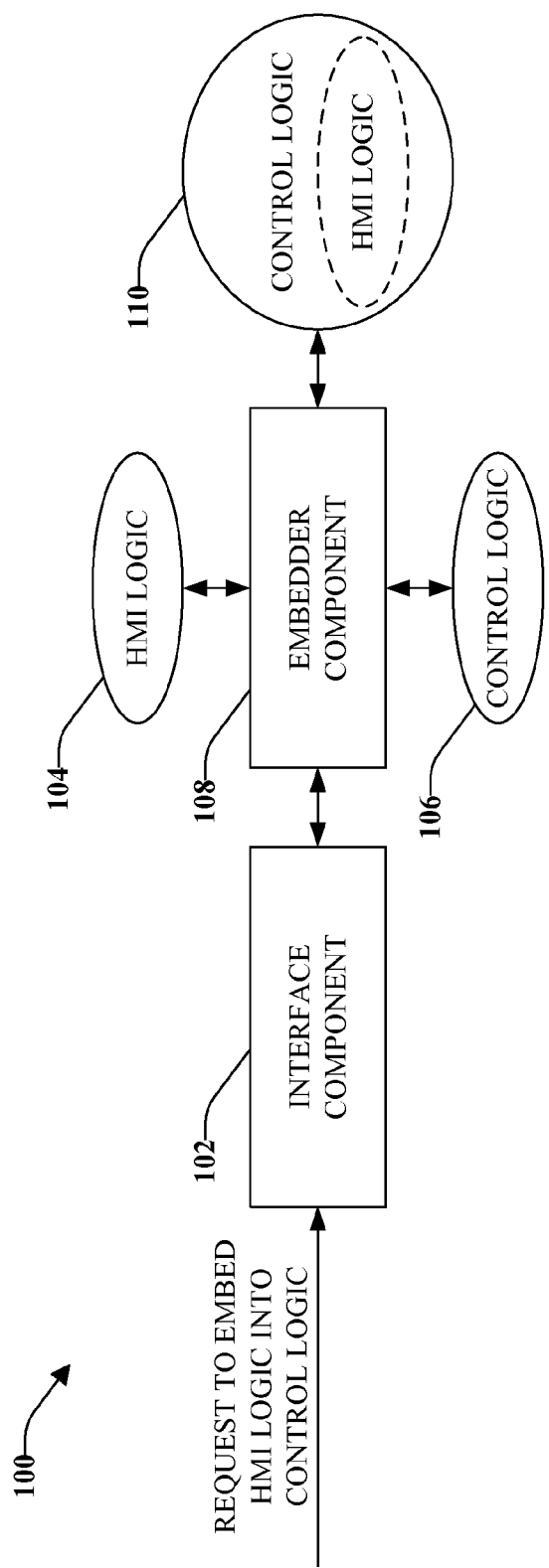
FIG. 1 is a high level block diagram of a system that facilitates embedding HMI logic into control logic.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that such matter can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component may be, but is not limited to a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

Furthermore, aspects of the disclosed subject matter may be implemented as a method, apparatus, or article of manufacture using standard programming and/or engineering techniques to produce software, firmware, hardware, or any combination thereof to control a computer to implement various aspects of the subject invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of what is described herein.

The subject matter described herein relates to embedding human-machine interface (HMI) logic within control logic, thereby reducing inefficiencies associated with creating HMI logic, including defining tags associated with inputs and outputs of the HMI logic. More particularly, integrating control logic and HMI logic conventionally involves utilization of a common database that is informative of memory locations that need to be defined and monitored by HMI logic and control logic, respectively. For instance, outputs from a rung of control logic can affect HMI logic (and vice versa). Therefore, memory locations (tags) must be defined with respect to the HMI logic and the control logic such that correct memory locations can be scanned and data can be retrieved therefrom. In contrast, the subject matter disclosed herein relates to integrating HMI logic and control logic, such that HMI logic can be embedded directly within control logic. How HMI logic communicates with other HMI logic (as well as control logic) can be based at least in part upon how such logic is wired up. Thus, for instance, if it is desirable to replicate HMI functionality with respect to several controllers, tags need not be redefined with respect to each of the several controllers.

Now referring to the drawings, FIG. 1 illustrates a system 100 that facilitates integrating human-machine interface (HMI) logic with control logic in industrial environments. The system 100 includes an interface component 102 that receives a request to embed HMI logic into control logic. HMI logic can also refer to an HMI device, such as a virtual (graphical) representation of a push-button, slide bar, a graph indicating status of a control process, or other graphical representation. Thus, HMI logic can be utilized to effectuate a graphical push-button, such that depression of the push-button on a pressure-sensitive screen causes a change in behavior of a control process. As an example, the request received by the interface component 102 can relate to embedding such push-button directly into control logic. For instance, a graphical user interface can be utilized to select HMI logic 104 that is desirably embedded within certain control logic 106. Thus, a "click and drag" approach can be utilized to select certain HMI logic 104 and control logic 106.

With more detail regarding the HMI logic 104, such logic can be wired up to other HMI logic and/or particular events that are associated with the HMI logic 104. For instance, the HMI logic 104 and the control logic 106 can be configured to operate in a data-drive architecture, where, in contrast to conventional systems, sequence of execution of logic can be controlled to avoid undesirable conditions, such as race conditions. Thus, rather than defining tags to associate the HMI logic 104 with the control logic 106, it is possible to wire up control logic and HMI logic in an integrated manner. Examples of such architecture are provided infra.

The interface component 102 is communicatively coupled to an embedder component 108, which can access the HMI logic 104 and the control logic 106 (which are the subject of the request). For example, the HMI logic 104 and/or the control logic 106 can be retained within memory of a combination logic controller/HMI, and graphical representations of such logic can be accessible to a user. The embedder component 108 can review how the HMI logic 104 is wired up with respect to other logic, including devices, other HMI logic, control logic, events, and/or the like. Once such determination is made, the embedder component 108 can output control logic with HMI logic embedded therein 110.

Pursuant to a detailed example, the HMI logic 104 can be a graph that illustrates a temperature of several pieces of welding equipment, such that multiple bars of the graph change position as temperature alters. The HMI logic 104 can be wired up to portions of control logic relating to temperature sensors (rather than requiring the HMI logic 104 to actively scan tags that are associated with the control logic). A change in temperature can be associated with an event, which is described in more detail below, that causes the HMI logic 104 to execute (e.g., refresh) in a proper order with respect to other logic. The HMI logic 104 can also be wired up to other HMI logic, including logic that causes colors of the bar graphs to change as temperature alters, as well as HMI logic that provides a digital readout of an average temperature of the several pieces of welding equipment (including HMI logic for summing temperatures and averaging temperatures). The HMI logic is wired up in such a manner that data is displayed appropriately to a user based upon one or more events (e.g., change in temperature). In an example, logic would be wired in such a manner that both size and color of the graph is determined prior to the graph being drawn. Again, as the HMI logic 104 and the control logic 106 are wired up with respect to other logic (and not tags, coils, etc.), the embedder component 108 can create the control logic with HMI logic embedded therein 110.

Advantages of utilizing the system 100 include an ability to copy the control logic with HMI logic therein 110 to multiple controllers without needing to ensure that the inputs and outputs of the HMI logic 104 and the control logic 106 are directed to appropriate memory locations (e.g., a tag database that defines interfacing between HMI logic and control logic need not be created or maintained). Additionally, offline programming can be accomplished and implemented without needing to define tag locations upon loading logic into a logic controller. Rather, a programmer can describe how logic is wired up with respect to other logic (and a sequence in which the logic should execute with respect to other logic).

Figure 2:
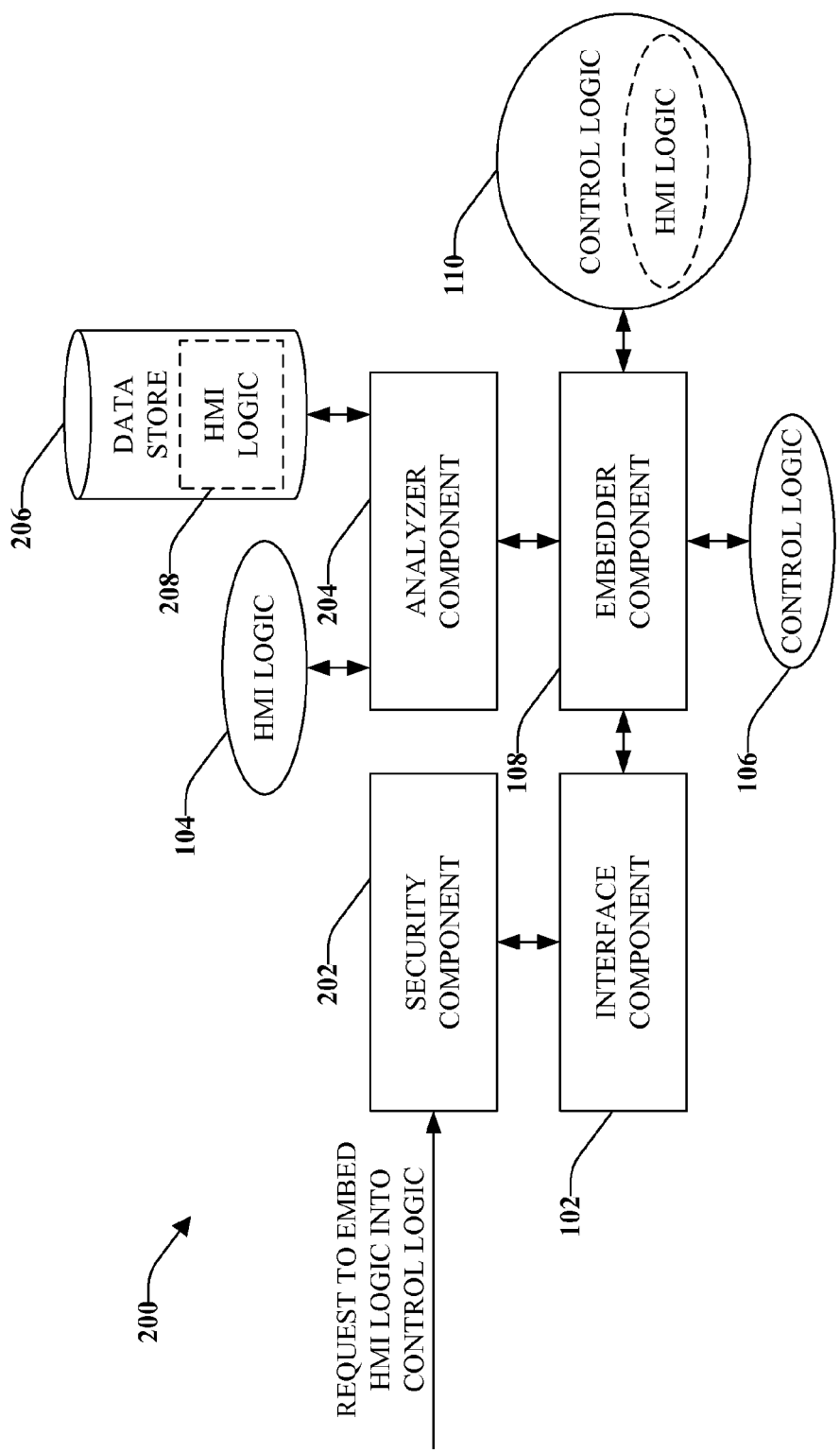
FIG. 2 illustrates a system for determining whether a user is authorized to embed certain control logic into particular HMI logic.

Now referring to FIG. 2, a system 200 is illustrated that enables HMI logic to be embedded within control logic. The system 200 includes a security component 202 that receives a request to embed HMI logic into control logic. The security component 202 can then be utilized to ensure that an initiator of the request is authorized to modify the control logic, access the HMI logic, and other suitable security features. For example, the security component 202 can request information that identifies the initiator of the request, such as a username, password, personal identification number, and/or provide the initiator of the request with security questions (e.g., questions that only should be known to a particular individual). Additionally, the security component 202 can receive and analyze biometric indicia, such as a fingerprint scan, a voice sample, a retina scan, or other suitable biometric indicia to identify the initiator of the request. Once the initiator of the request has been identified, security privileges associated with such individual can be ascertained by reviewing a security database (not shown). For instance, the individual may have rights to embed certain HMI logic 104 (such as HMI indicator logic that enables display of process variables without modifying the process) into the control logic 106 but not another piece of control logic. In another example, the individual may have rights to embed certain non-restricted HMI logic into control logic or to embed the HMI logic 104 into certain non-restricted control logic. Thus, the security component can effectuate and enforce multiple levels of security with respect to embedding HMI logic into control logic.

Once the security component 202 has determined that the initiator of the request is authorized to embed the HMI logic 104 into the control logic 106, such request can be relayed to the interface component 102, which can then provide the request to the embedder component 108. An analyzer component 204 is associated with the embedder component 108, and analyzes the HMI logic 104 that is desirably embedded within the control logic 106 to determine how the HMI logic 104 is wired up (with respect to other HMI logic as well as the control logic 106). If the HMI logic 104 is wired up to other HMI logic that is not embedded within the control logic 106, for example, the analyzer component 204 can access a data store 206 that retains other HMI logic 208 that may be wired up to the HMI logic 104. Thus, if the HMI logic 104 depends upon other HMI logic, the analyzer component 204 can automatically locate such logic by analyzing the HMI logic 208 retained within the data store 206. Pursuant to an example, the data store 206 can be internal to a combination controller/HMI, can be accessible by way of a network, can be located within a web server, a server on a factory floor, etc. Once all appropriate HMI logic is located, the analyzer component 204 can provide the embedder component 108 with such logic, and the embedder component 108 can thereafter embed all necessary HMI logic into the control logic 106 (thereby outputting the control logic with HMI logic embedded therein 110).

Figure 3:
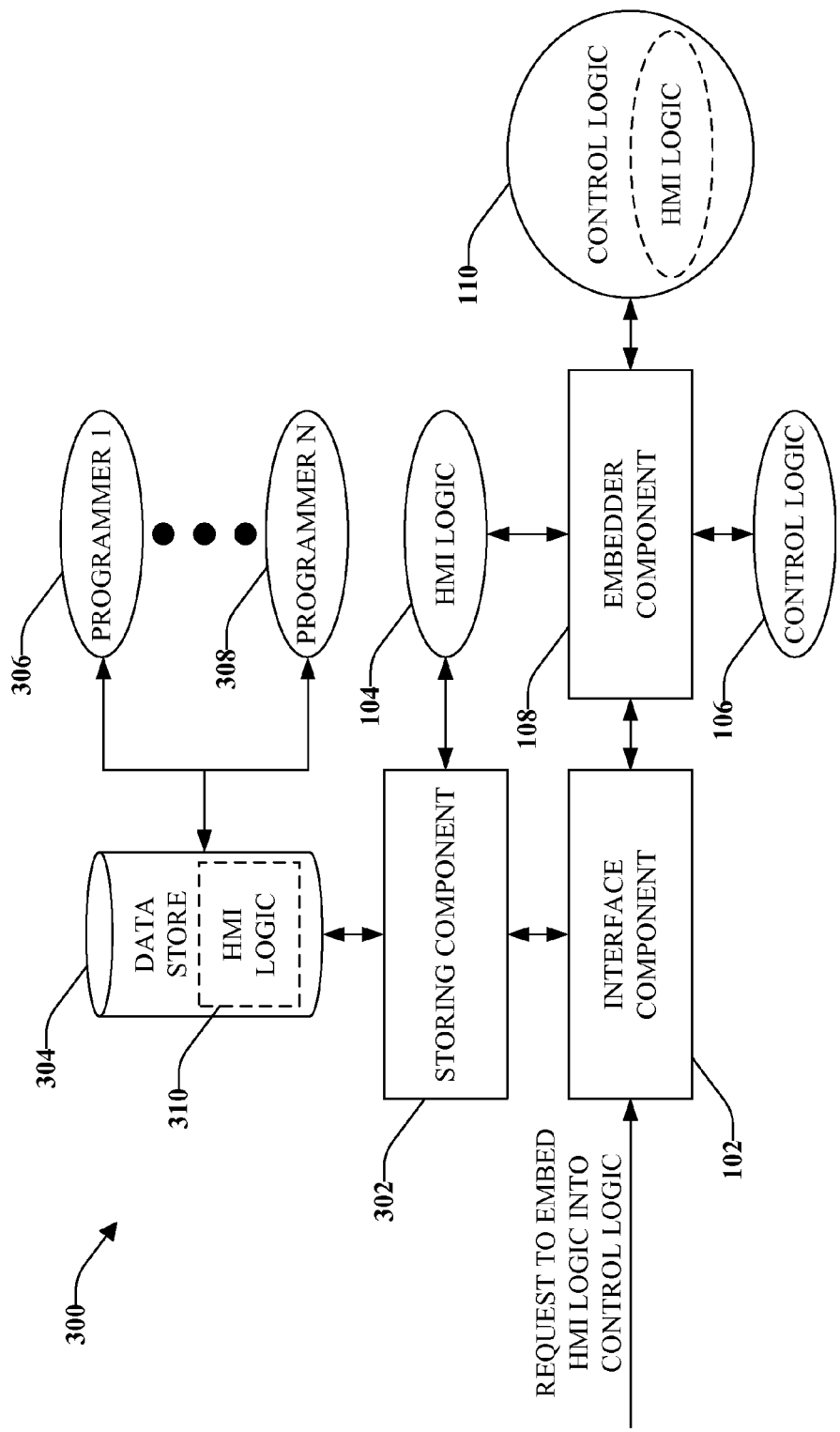
FIG. 3 illustrates a system for editing HMI logic and placing such edited logic in a data store that is accessible by multiple programmers.

Turning now to FIG. 3, a system 300 is illustrated that facilitates embedding HMI logic into control logic. The system 300 includes the interface component 102 that receives the request to embed HMI logic into control logic. For example, the requested HMI logic 104 can be resident within data storage local to a combination controller/HMI, can be provided by the initiator of the request, and/or the like. The system 300 additionally includes a storing component 302 that enables the HMI logic 104 to be stored within a data store 304 that is accessible by multiple programmers 306-308. Thus, the data store 304 can include HMI logic 310 associated with several programmers, and different programmers 306-308 can access the HMI logic 310 therein (and use such logic with different control logic, access particular logic for editing, etc.).

The system 300 additionally includes the embedder component 108, which can embed the requested HMI logic 104 into particular (selected) control logic 106. Pursuant to an example, the HMI logic 104 can be placed within a particular rung of control logic. Additionally, as described above, the HMI logic 104 can be placed within the control logic 106 based upon how the HMI logic 104 is wired up with respect to other HMI logic and the control logic 106. Additionally, in a data-driven system, the HMI logic 104 can be placed nearly anywhere within the control logic 106, as long as sequence of execution of logic is defined. The embedder component 108 can embed the HMI logic 104 into the control logic 106 to output the control logic 110 (with the HMI logic 104 embedded therein).

Figure 4:
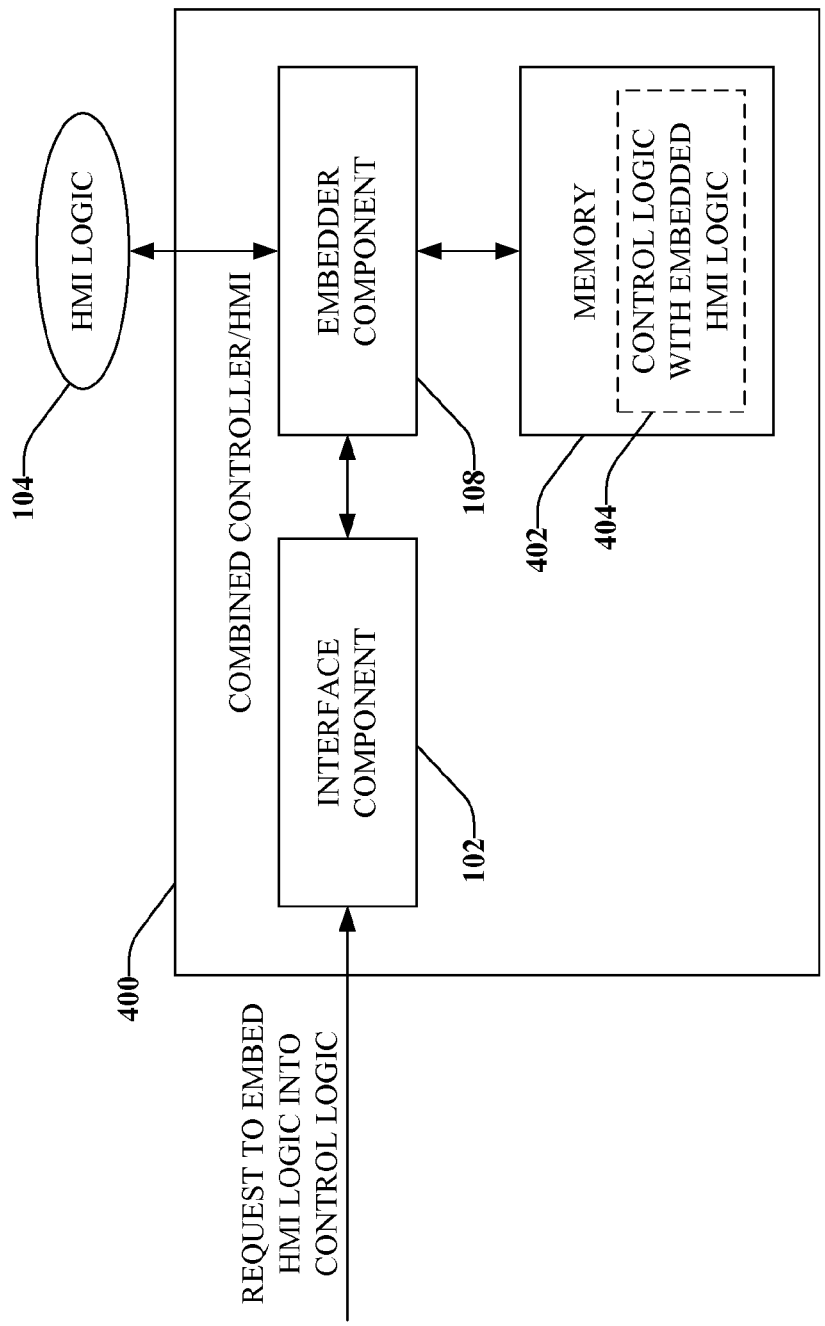
FIG. 4 is CHMI that can be utilized in connection with embedding HMI logic into control logic.

With reference to FIG. 4, a combined controller/HMI 400 is illustrated. For example, the combined controller/HMI 400 can be a single device that can execute control logic (and thus control one or more processes) as well as provide HMI functionality, such as push-buttons, process variable values, and the like to an operator. The combined controller/HMI 400 includes the interface component 102, which can be utilized to receive a request to embed HMI logic into control logic that resides within memory 402 of the combined controller/HMI 400. For instance, the interface component 102 can be or comprise a port, a cable, a bus, keys, a microphone, and/or any suitable software that can enable the combined control/HMI 400 to receive the request.

The interface component 102 is communicatively coupled to the embedder component 104, which can access the HMI logic 104 that is the subject of the request. The HMI logic 104 can be retained within a data store that is accessible to the combined controller/HMI 400 over a network, such as within a network server. In another example, the HMI logic 104 can be stored within a computing device that is coupled to the combined controller/HMI 400 by way of a USB connection. Further, the HMI logic 104 can be retained internal to the combined controller/HMI 400.

The interface component 102 is coupled to the embedder component 108, which can access the memory 402 to locate appropriate control logic within such memory 402. The embedder component 108 can then be utilized to embed the HMI logic 104 into the control logic within the memory 402, resulting in control logic with embedded HMI logic 404 within the memory 402. The combined controller/HMI 400 can additionally include a processor (not shown) that is configured to execute the control logic with embedded HMI logic 404. While shown as a combined controller/HMI 400, it is understood that a logic controller alone can be configured to execute the control logic with embedded HMI logic 404. More particularly, an HMI terminal communicatively coupled to a controller can act as a thin client, as the HMI terminal need not execute HMI logic. Rather, such logic is executed by the controller, and the HMI terminal need only receive input from a user (e.g., depression of a push-button) and graphically illustrate a process to the user.

Figure 5:
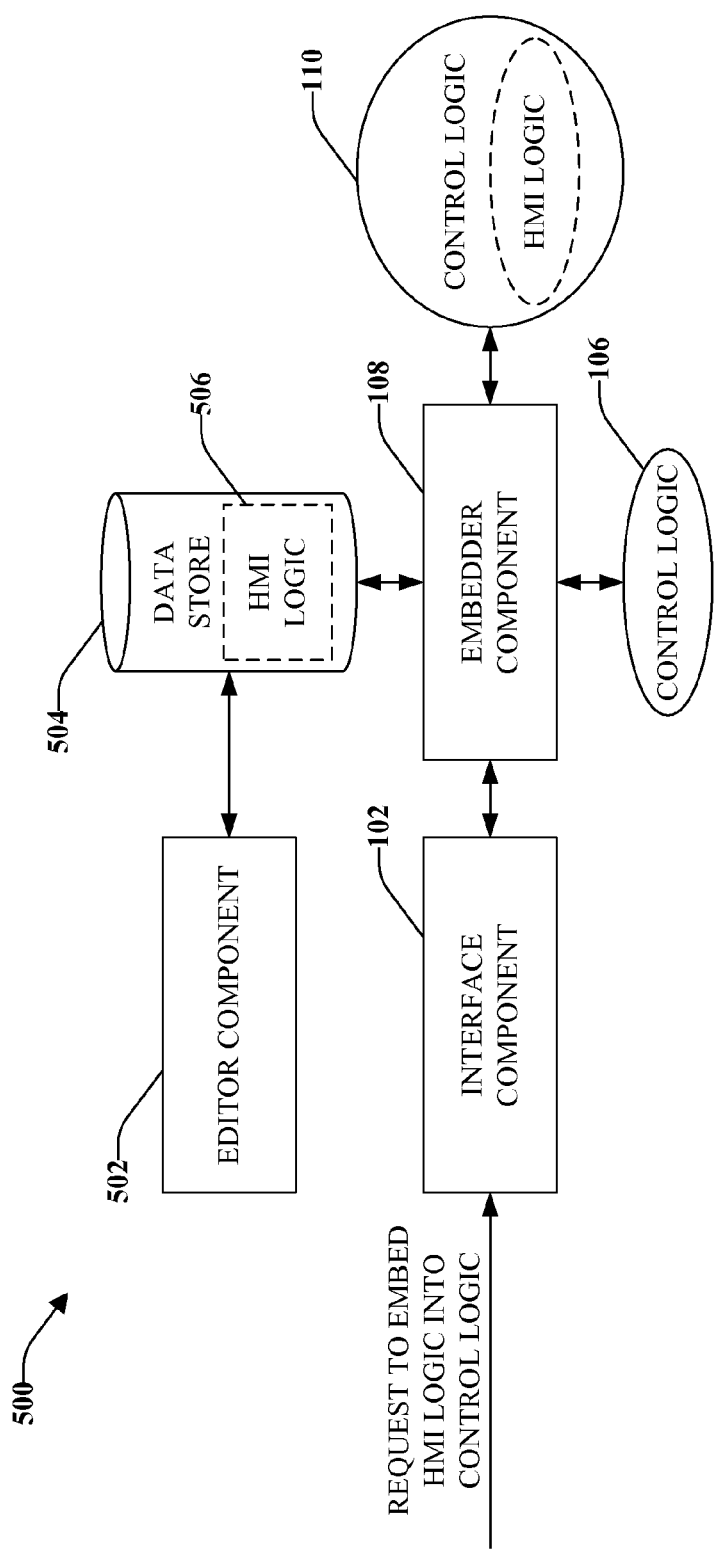
FIG. 5 illustrates a system for editing HMI logic and placing such edited logic in a data store that is accessible by multiple programmers.

Now referring to FIG. 5, a system 500 is illustrates that facilitates editing HMI logic and embedding such logic into control logic. The system 500 includes an editor component 502 that enables an operator to create and/or edit HMI logic. For instance, the editor component 502 can be employed to access a data store 504 that retains HMI logic 506, and can thereafter be utilized to modify HMI logic according to a programmer's desires. Further, the editor component 502 can be used to save changes to the HMI logic 506 in the data store 504. As before, the data store 504 can be within a control device, resident upon a network, and/or the like.

The system 500 additionally includes the interface component 102, which can receive the request to embed HMI logic into control logic, wherein the HMI logic is recently edited HMI logic. The embedder component 108 is communicatively coupled to the interface component 102 and locates HMI logic that is within the data store 504 as well as the desired control logic 106. The embedder component 108, as described above, can then embed the HMI logic into the control logic 108 to output the control logic 110 (with the HMI logic embedded therein).

Figure 6:
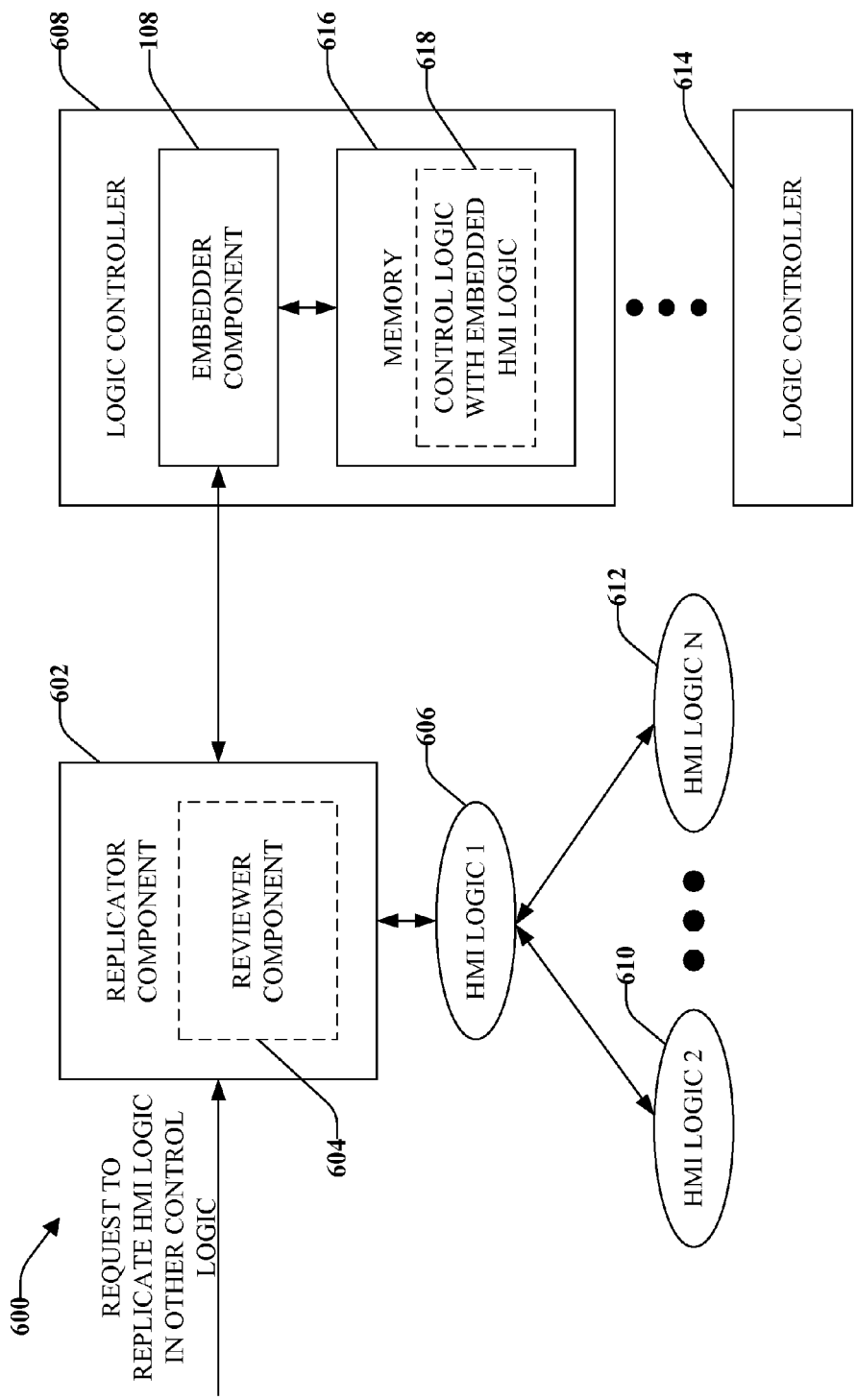
FIG. 6 illustrates a system for replicating HMI logic that is embedded within control logic.

Turning now to FIG. 6, a system 600 for replicating HMI logic with respect to multiple logic controllers is illustrated. The system 600 includes a replicator component 602 that receives a request to replicate HMI logic and place it within one or more other logic controllers. For instance, the requested HMI logic can be resident within a data repository that is accessible by the replicator component 602, such as within a network server. The replicator component 602 is associated with a reviewer component 604, which can review associations of HMI logic that is requested for replication. In more detail, the reviewer component 604 can analyze how HMI logic requested for replication is wired up with respect to other HMI logic (and/or control logic). Pursuant to an example, an individual can request that HMI logic 606 be replicated such that the HMI logic 606 can be executed in one or more logic controllers 608-610. The replicator component 602 can receive the request and initiate the reviewer component 604, which can analyze the HMI logic 606 that is the subject of the request for associations. For instance, the reviewer component 604 can determine that the HMI logic 606 is wired up with respect to several other pieces of HMI logic 610-612. Accordingly, even though not explicitly requested, the replicator component 602 can replicate the HMI logic 610-612 together with the HMI logic 606 that is the subject of the request.

The portions of HMI logic 606, 610, and 612 can be provided to the embedder component 108. While shown as residing within the logic controller 608, it is to be understood that such component 108 can reside within a device that is external to the logic controller 608. Additionally, the replicator component 602 can provide the portions of HMI logic 606, 610 and 612 to additional logic controllers (such as logic controller 614). Still further, the logic controller 614 (and other logic controllers) can include components substantially similar to the embedder component 108. When the embedder component 108 receives the HMI logic 606 and associated logic 610-612, the embedder component 108 can access memory 616 within the logic controller 608 (which includes control logic) and embed the HMI logic 606, 610, and 612 within the memory 616 (creating control logic with HMI logic embedded therein 618).

Figure 7:
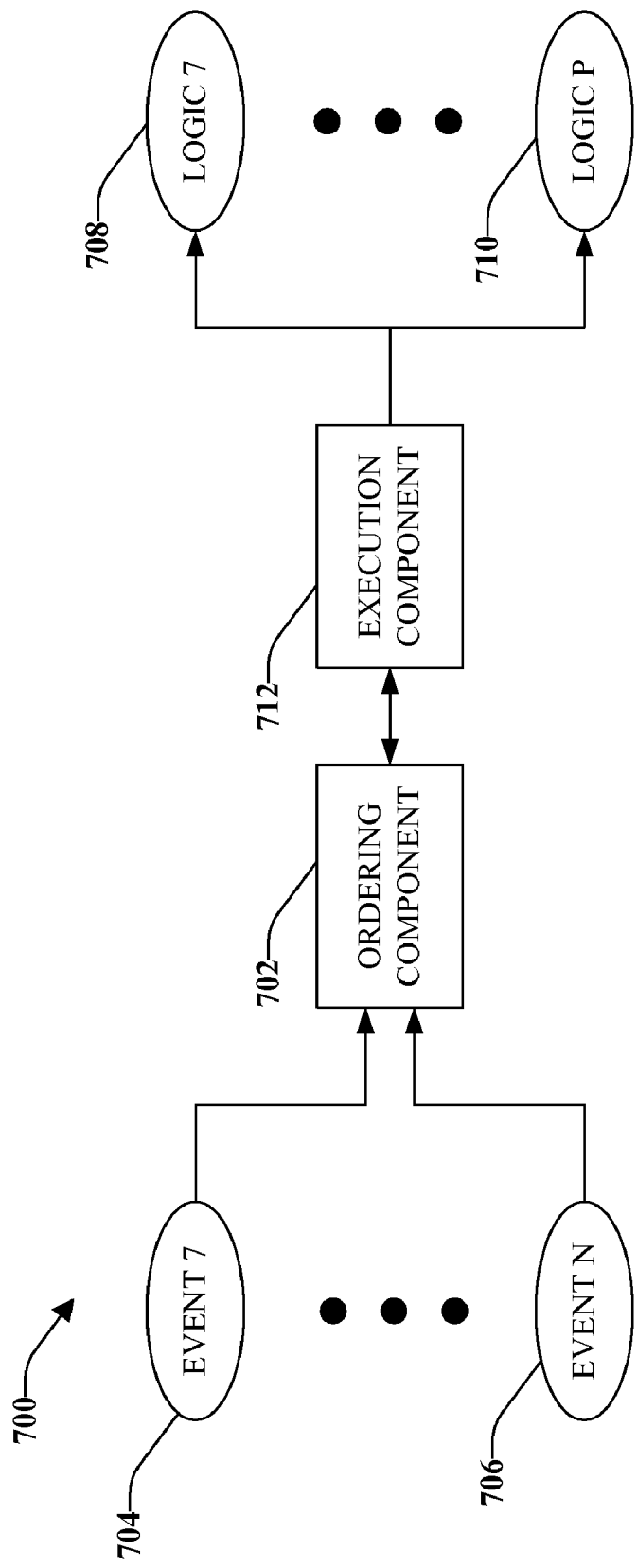
FIG. 7 is a high level block diagram of a system that facilitates ordering events for execution in a system that utilizes a data-driven architecture.
Figure 8:
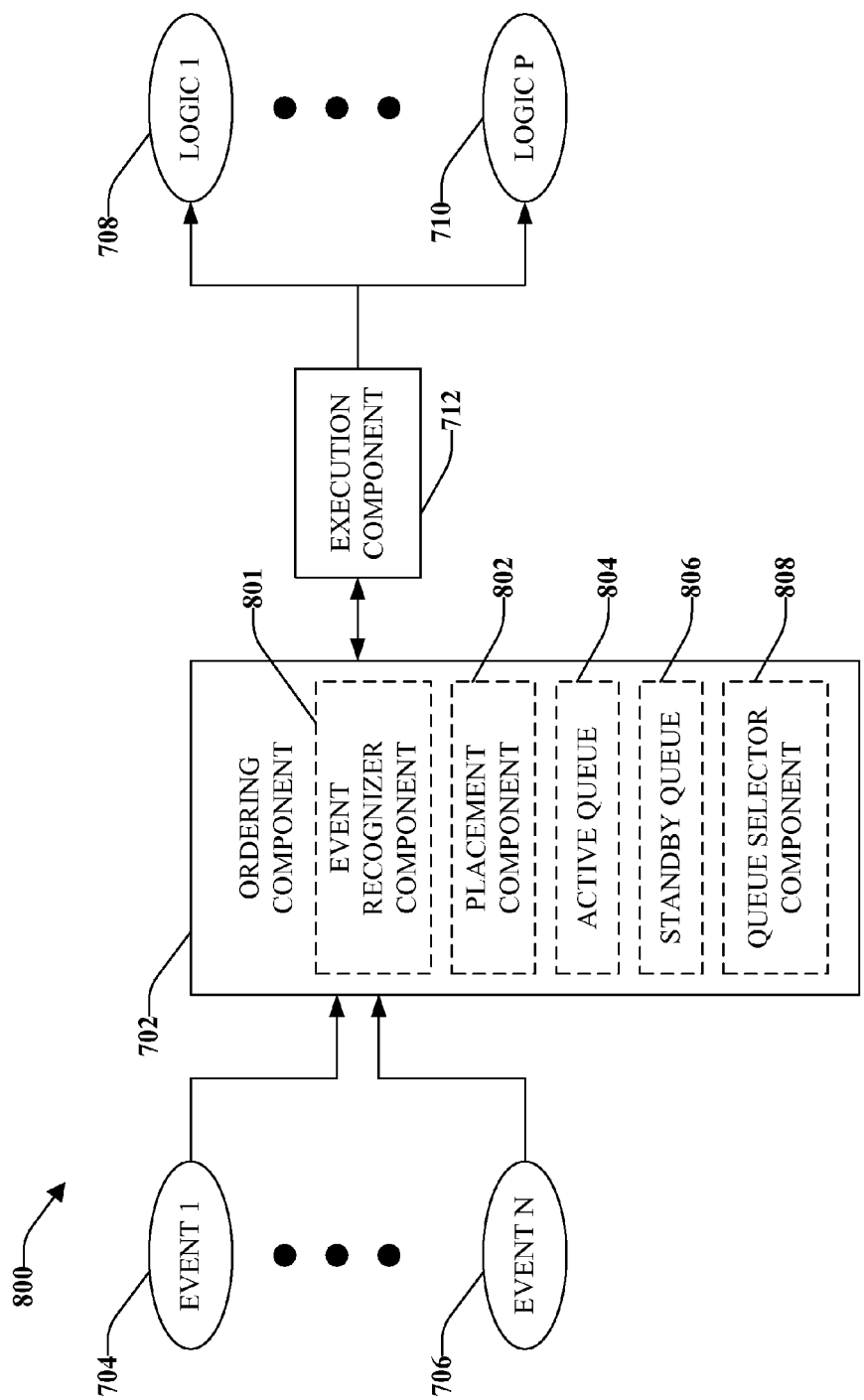
FIG. 8 illustrates usage of multiple queues to ensure that events are not executed out of a desired order.

Referring collectively to FIGS. 7 and 8, an example architecture is described that shows how embedded HMI logic can be utilized. It is understood, however, that HMI logic can be embedded within control logic and can be executed in a traditional scanning ladder logic architecture. Now referring specifically to FIG. 7, a system 700 that facilitates initiating logic in a particular order is illustrated, wherein initiation of the logic in the particular order reduces overhead associated with conventional architectures that scan each rung of ladder logic without compromising predictability and reliability. For example, the system 700 can reside within an industrial controller (such as a programmable logic controller), an HMI, and/or a combined controller/HMI. Additionally, the system 700 is not limited to an industrial environment, and can operate in devices such as a personal computer, a portable phone, a personal digital assistant (PDA), etc. The system 700 includes an ordering component 702 that receives an indication that one or more events have occurred. An event, for instance, can be instructions for initiating one or more portions of logic, wherein the instructions are associated with an indication that a process variable has been altered. An event, as utilized herein, represents an alteration in a data value somewhere within a system, such as a process value, a state of an operator control (e.g., when an operator depresses a button, a state associated therewith changes from un-depressed to depressed). Such alteration of the process variable can have an effect on several pieces of logic (HMI and control logic), and the alteration can cause an event to be generated for each of the several portions of logic. Thus, one change in a process variable can be associated with multiple events (representative of one or more data changes). Additionally, an event can be associated with a human action, such as the depression of a push button or other suitable user action. Again, the user action can cause multiple pieces of logic to react, such as causing an adder to sum different values, causing a human-machine interface graphical icon to be redrawn, etc. Thus, the user action can be associated with multiple events with respect to several different portions of logic.

Still further, events can be dependent upon one another and/or initiate other events. For example, a user can depress a push button, which indicates that HMI logic should be initiated, wherein the logic is configured to redraw a graphical depiction of a process. Prior to performing the redraw, however, temperatures associated with the HMI may need to be re-sensed, converted, and summed. Depression of the push-button can cause multiple events to execute, including an event associated with a sensor, an event associated with a converter, an event associated with an adder, and an event associated with redrawing logic, wherein execution of an event refers to initiating logic. It may be imperative, however, that different portions of logic be initiated in a certain order, as redrawing prior to conversion may cause an incorrect value to be displayed to a user, can result in an infinite loop, and/or other undesirable outcomes.

Accordingly, the ordering component 702 can receive one or more events 704-706 and order the events 704-706 based at least in part upon a predefined organization of multiple portions of logic 708-710. The logic 708-710 can be control logic, HMI logic, or any other suitable logic. For instance, the logic 708-710 can relate to sensors, graphical icons, software functions (such as an adder, multiplier, etc.). Additionally, the logic 708-710 can be associated with an indication of priority (e.g., numbers, letters, . . . ), such that events associated with certain portions of logic are executed in a particular order. For instance, in a conventional data-driven system, events are pushed to logic, and the logic is initiated in an order that the events are received by the logic; thus, pieces of logic can be initiated out of a desired order. More particularly, order of receipt of events may not correspond to an order with respect to which the events should be executed. Based upon an organization of the logic 708-710 (e.g., an ordering indication assigned to the logic 708-710), the ordering component 702 can organize the events 704-706 such that one or more of the pieces of logic 708-710 are initiated in the proper order.

An execution component 712 is configured to execute the events 704-706 in an order determined by the ordering component 702. For example, the ordering component 702 can order the events 704-706 such that the logic 710 should be initiated first, followed by logic 708 being initiated. The execution component 712 can then execute the events such that the logic 710 is first initiated followed by the initiation of the logic 708.

In a still more detailed example, an operator may depress a push button, which can desirably cause two different temperature readings to be undertaken by two sensors (which determine temperatures in Celsius). Thereafter, the two temperatures are desirably converted to the Fahrenheit scale, summed by an adder, averaged by a dividing device, and then a graphical device that illustrates the average temperature desirably redraws a graphical icon indicating an average value. It can be discerned that order of execution of the events is important, as conversion of the temperatures should be completed prior to summing, summing should be completed prior to averaging, and averaging should be completed prior to redrawing. In conventional scanning systems, each line of code can be scanned to ensure that the events are executed in a proper order, wherein such scanning is associated with a large amount of overhead (as tens of thousands of lines of code may be scanned even though a vast majority of such lines are irrelevant).

As described above, events may not be received in a proper order. For instance, an event received first in time may be related to obtaining a first sensed value, an event received second in time may be related to converting the sensed value from Celsius to Fahrenheit, an event received third in time may relate to adding two sensed temperatures, an event received fourth in time may relate to redrawing a graphical icon, etc. Conventional data-driven architecture systems execute the events in such an order, which can result in one or more errors or improper values being displayed. More specifically, the adder would be adding the first temperature (converted) with a previous temperature in memory or a zero value (wherein such temperature may or may not be converted), and the graphical device would attempt to redraw the temperature prior to being averaged (e.g., an obsolete average may be redrawn or an error may occur).

The system 700 mitigates occurrences of these and similar errors by ordering events prior to execution thereof, wherein the order is based at least in part upon an organization of the logic 708-710. Continuing with the above example, logic that causes the two sensors to undertake a reading (or causes a reading to be captured) may be associated with numbers (or other indicia) that indicate that events associated therewith should be executed prior to events associated with the converters. Similarly, the adder can be associated with data that indicates that events associated with the adder should not be executed until after the events associated with the converters are executed. Therefore, the events will be executed in an appropriate order by the execution component 712, and less overhead will be required when compared to conventional scanning systems.

It is also to be appreciated that the ordering component 702 can receive a single event and place such event with respect to at least one other event in an appropriate order. Thus, for instance, the ordering component 702 can receive an event that causes two values to be added, and such event can be dynamically placed by the ordering component 702 after an event that causes at least one of the two values to be converted to a different format.

With reference now to FIG. 8, an event execution system 800 is illustrated. The system 800 includes the ordering component 702, which receives the plurality of events 704-706 (wherein the events can be received in any order). Events can often be received in an order that would cause an undesirable condition to occur, such as a race condition. The ordering component 702 can include an event recognizer component 801, which can recognize events based upon a number or other identifying indicia associated with logic that acts based upon the events. For example, the logic 710 can be associated with a number, letter, combination thereof, or other suitable indicia. Similarly, the logic 708 (and other logic) can be assigned indicia that identifies (and orders) such logic. Events that affect the logic 708-710 can then be ordered based upon an ordering of the logic 708-710.

The ordering component 702 is also associated with a placement component 802, which can place received events in one of an active queue 804 and a standby queue 806, depending upon a currently or most-recently executed event. Utilization of the active queue 804 and the standby queue 806 can ensure that events are not executed out of a desired order. For instance, the active queue 804 can include unexecuted events 4, 5, 9, and 12, and the event recognizer component 801 can determine that the ordering component 702 has received an event that is desirably executed between events 9 and 12 (e.g., an event 11). The placement component 802 can place the received and recognized event within the active queue 804 between events 9 and 12.

In another example, the active queue 804 can include events 19, 21, 30, and 45, and the execution component 712 can have most recently executed event 16 (e.g., pulled or pushed event 16 from the active queue 804 and executed such event with respect to a particular device). The ordering component 702 may then receive another event that is recognized as being upstream from a most recently executed event (e.g., event 10). The placement component 802, rather than placing the event at the front of the active queue 804 (and causing events to be executed out of a desired order), can place the event in the standby queue 806. The execution component 712 can then continue to receive pushed events (or pull events) from the active queue 804 and execute such events, and the placement component 802 can place received events in an appropriate queue. With more specificity, the placement component 802 can place "downstream" events (events that are ordered after a currently or most recently executed event) in the active queue 804 and can place "upstream" events (events that are ordered before a currently or most recently executed event) within the standby queue 806.

The system 800 can additionally include a queue selector component 808, which can change the active queue 804 to the standby queue 806 and the standby queue 806 to the active queue 804. More particularly, when the execution component 712 has executed each event within the active queue 804, the queue selector component 808 can redirect the execution component 712 to the standby queue 806 (thereby rendering such queue as being active). Thus, the system 800 can act as a scanning system without being associated with overhead associated with conventional scanning systems. For instance, if no events have occurred, resources allocated to the system 800 can be allocated to different tasks. Further, the system 800 can be altered such that only a single queue is utilized. For example, if a downstream event is received, it can be placed at the end of the queue, thus creating a loop of events to be executed. Additionally, it is to be understood that while some components are illustrated as residing within other components, each component can be separate and/or a subset of components can reside within other components and can operate in conjunction to act as the illustrated system 800. Further, the claims are not intended to be limited by the arrangement of components shown in the drawings.

The architectures described with respect to FIGS. 7 and 8 can be utilized in connection with embedding HMI within control logic. More particularly, a manner with respect to which logic is wired up with other logic (both HMI logic and control logic) and ordering of initiation of the logic given an event enables seamless embedding of HMI logic into control logic. Furthermore, offline programming can be undertaken and implemented within a controller quickly and easily, due to the lack of a requirement to define memory locations within a database that is conventionally used to interface HMI logic with control logic.

Figure 9:
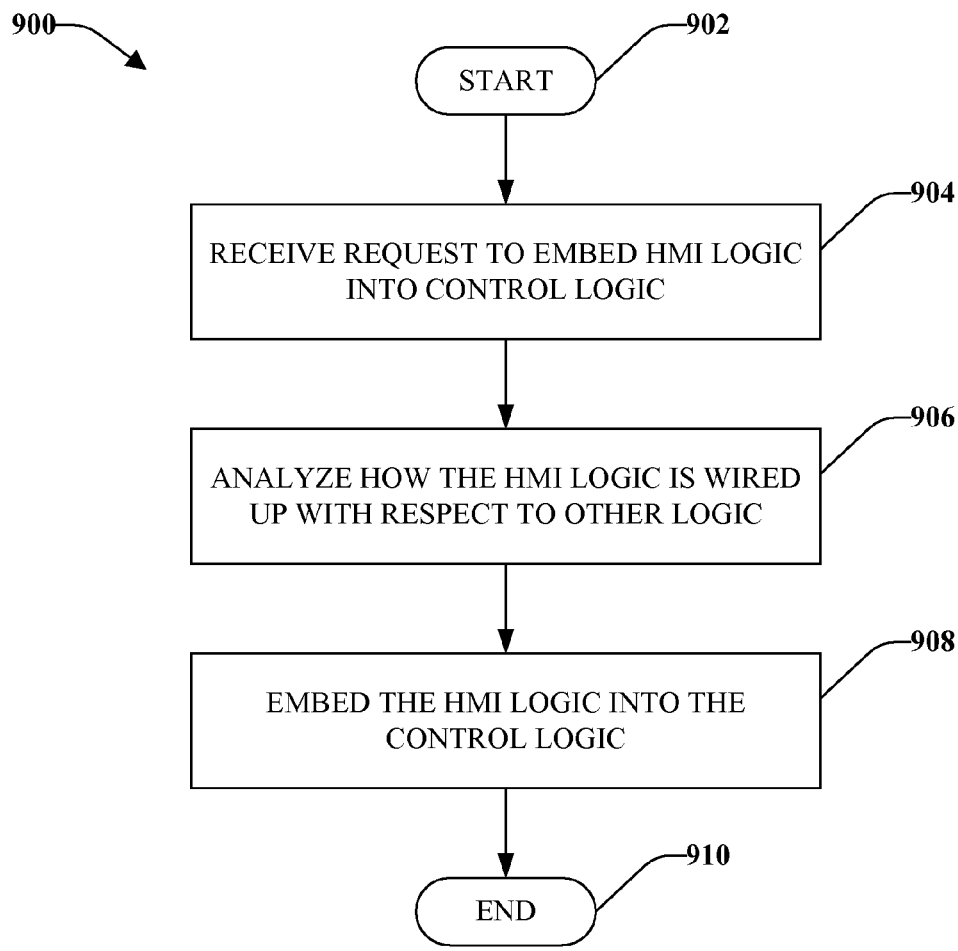
FIG. 9 is a representative flow diagram that illustrates a methodology for embedding HMI logic into control logic.
Figure 10:
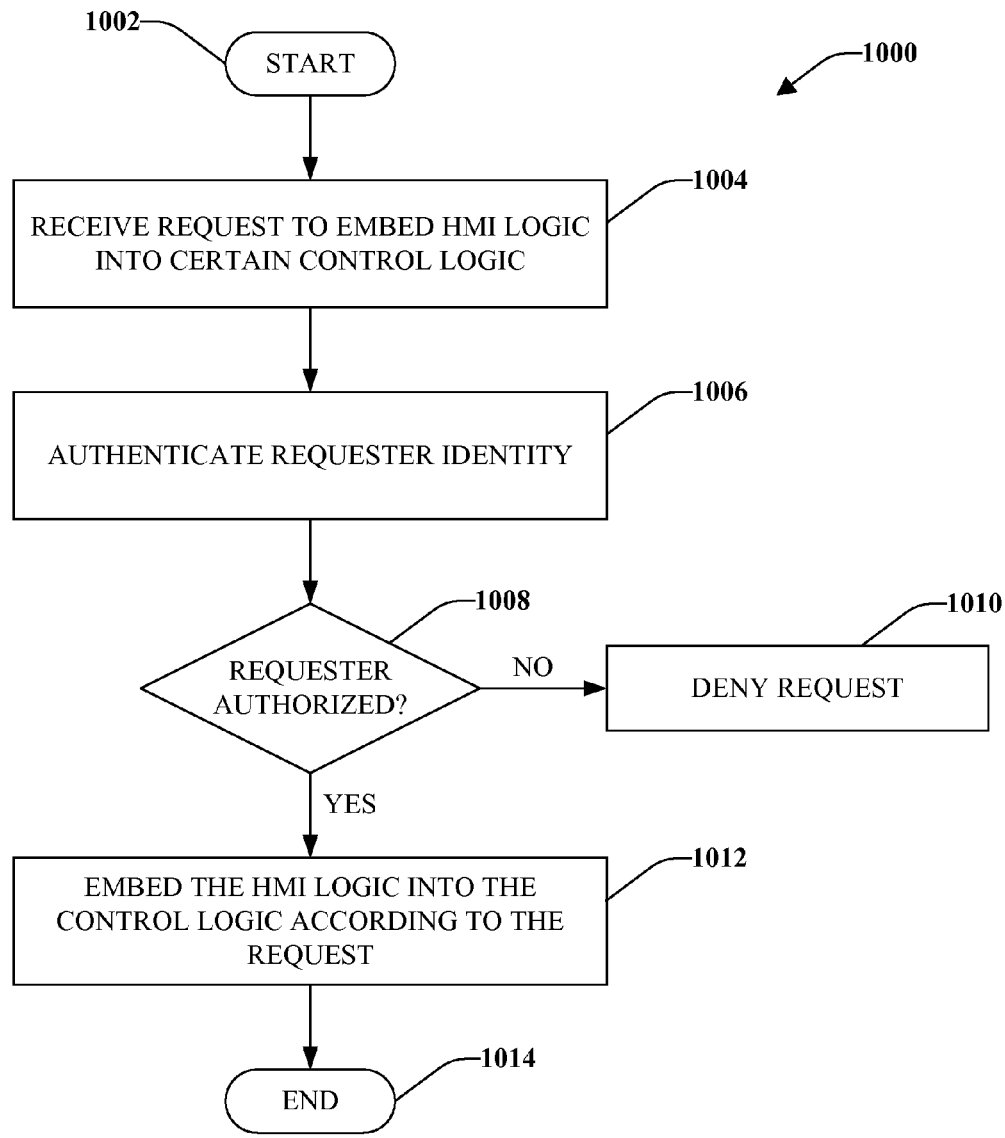
FIG. 10 is a representative flow diagram that illustrates a methodology for determining whether a user is authorized to embed certain HMI logic into particular control logic.
Figure 11:
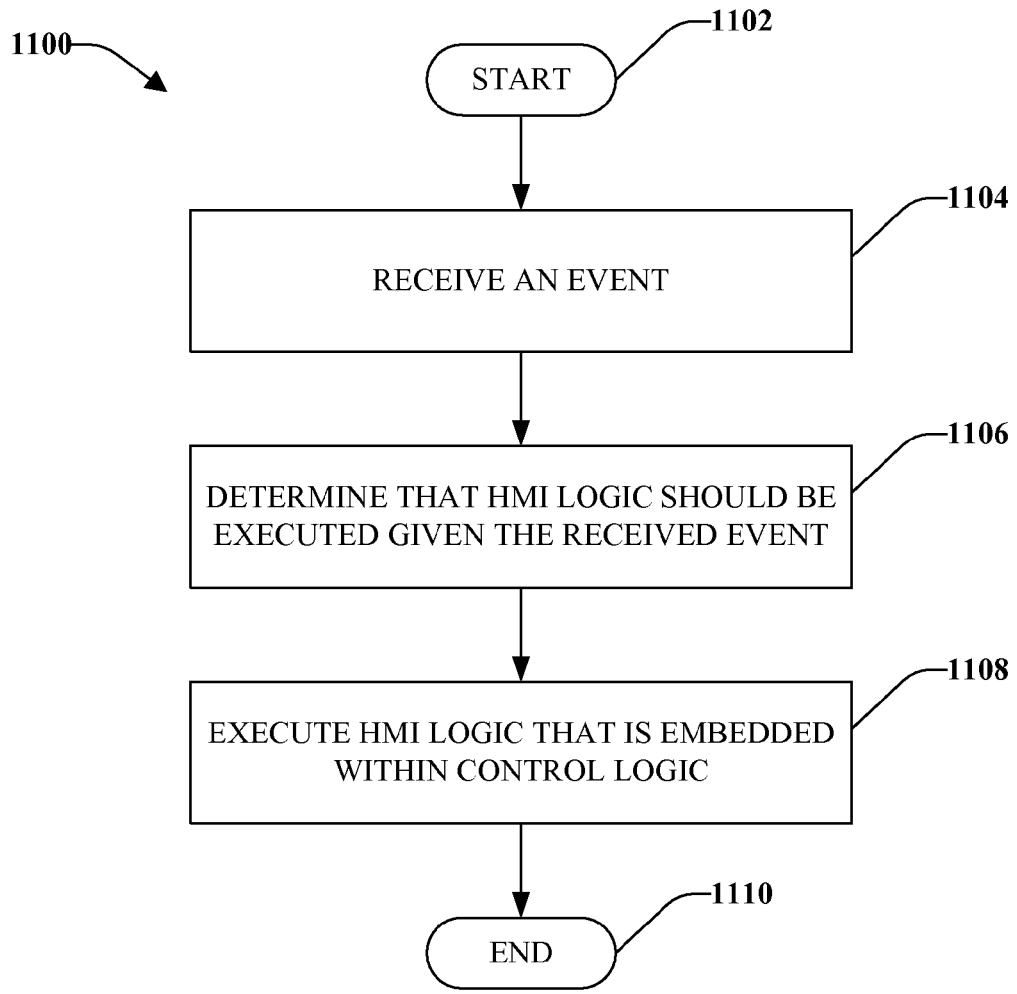
FIG. 11 is a representative flow diagram that illustrates a methodology for executing control logic with HMI logic embedded therein.

Turning to FIGS. 9-11, methodologies relating to embedding HMI logic within control logic are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring specifically to FIG. 9, a methodology 900 for embedding HMI logic directly into control logic (which may be ladder logic) is illustrated. The methodology 900 starts at 902, and at 904 a request to embed HMI logic into control logic is received. For example, a programmer may select HMI logic (which can be represented as a graphical device) and "drag" it into a particular portion of control logic, such as within a rung of ladder logic. At 906, a manner in which the HMI logic is wired up with respect to other logic is analyzed. For instance, the HMI logic may be a push button which is desirably wired up with respect to a counter. Thus, if the push-button is depressed for a particular amount of time (e.g., five seconds), then certain actions can be undertaken (e.g., a process can be halted). In another example, the HMI logic may represent a push button that is wired up with respect to HMI logic that represents another push button. Therefore, for instance, depression of a first push button can cause a first control action to be undertaken, depression of a second push button can cause a second control action to be undertaken, and depression of both push buttons can cause a third control action to be undertaken.

At 908, the HMI logic is embedded into the control logic while taking into consideration how the HMI logic is wired up with respect to other logic (control logic or HMI logic). For example, the control logic with HMI logic embedded therein can be compiled such that HMI logic and/or control logic is initiated given certain events. Additionally, the control logic can be ladder logic, and the HMI logic embedded therein can be graphical representations of HMI devices, such as push-buttons, counter displays, and/or the like. Thus, if a push-button is depressed, a contact in ladder logic can be closed. The methodology 900 then completes at 910.

Now referring to FIG. 10, a methodology 1000 for embedding HMI logic into control logic is illustrated. The methodology 1000 initiates at 1002, and at 1004 a request to embed HMI logic into control logic is received. For instance, the request can be a voice request, a written request through a computer, a request initiated through utilization of a pointing and clicking mechanism, a pressure-sensitive screen and a stylus, and/or any other suitable manner for receiving a request. Therefore, voice analysis can be undertaken to determine which HMI logic a programmer is requesting. At 1006, the identity of the initiator of the request is authenticated.

Pursuant to an example, the initiator of the request can be prompted for a username, a password, a personal identification number, biometric data, answers to security questions, and/or other suitable manners for authenticating the identity of the requester.

Once the identity of the requester has been authenticated, at 1008, a determination is made regarding whether the requester has rights to embed the selected HMI logic into the particular control logic. For instance, a programmer of a first process may not have rights to embed HMI logic into control logic that is not associated with the first process (but is rather associated with a second process). Requester rights can also depend upon user role (e.g., whether the requester is an executive, a manager, a machine operator, . . . ), time of day, day of week, user location (e.g., the requester may be authorized to alter the control logic only at a certain workstation), and other suitable contextual data.

If the requester is not authorized to embed the HMI logic into the control logic, then at 1010 the request is denied. For example, the user can be informed through a graphical user interface that they do not have rights to perform the requested embedding. If the requester is authorized to undertake the requested embedding, then at 1012 the HMI logic is embedded within the control logic according to the request. The methodology then completes at 1014.

Turning now to FIG. 11, a methodology 1100 for executing control logic with HMI logic embedded therein is illustrated. The methodology 1100 starts at 1102, and at 1104 an event is received. For instance, the event can be a user action (e.g., a depression of a push-button) or a change in a process variable. At 1106, a determination is made that HMI logic should be executed given the received event. In an example, a user can depress a push button, causing an event to be pushed to a particular piece of HMI logic. In another example, the control logic can be scanned upon occurrence of the event. At 1108, the HMI logic that is embedded within the control logic is executed. The methodology 1100 then ends at 1110. For instance, a logic controller can be configured to execute the methodology 1100.

Figure 12:
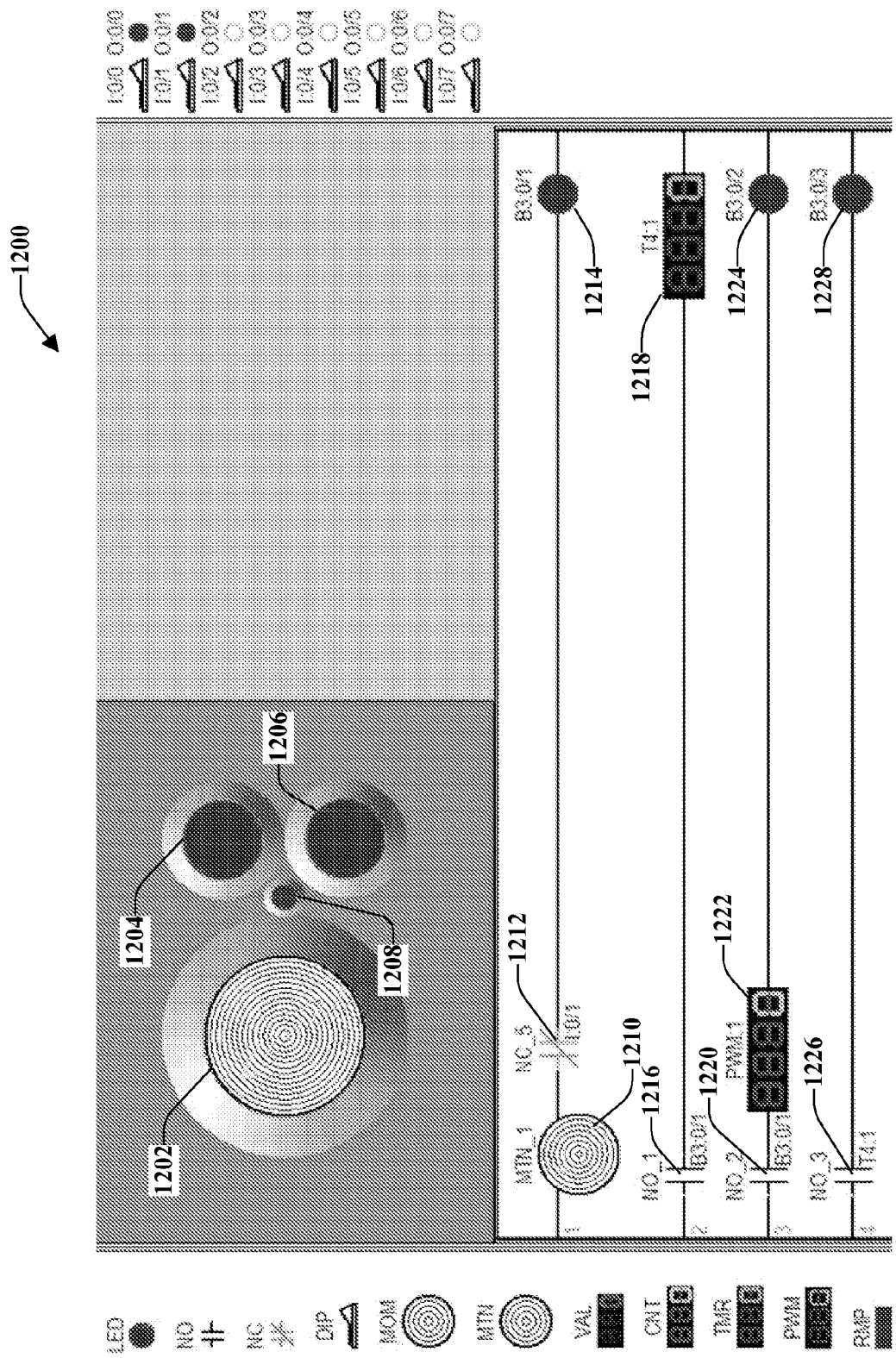
FIG. 12 is a screenshot that illustrates HMI logic embedded within ladder logic.

Turning now to FIG. 12, a screenshot 1200 that illustrates HMI logic embedded into control logic is illustrated. The screenshot 1200 depicts a push-button 1202 that is associated with three status indicators 1204-1208, which can be provided with light and/or change color depending upon status of the push-button 1202. Beneath such depiction is ladder logic with HMI logic embedded directly therein. More particularly, a push-button 1210 that corresponds to the push-button 1202 can be placed within ladder logic. If the push-button 1202 is depressed, a contact 1212 can be closed, and one of the status indicators 1204-1208 can be activated. The activation of a status indicator 1214 that corresponds to at least one of the status indicators 1204-1208 can cause a contact 1216 to be closed, which can initiate a counter 1218 that resides within the ladder logic. A contact 1220 can then be closed, which initiates a second counter 1222. A status indicator 1224 that corresponds to at least one of the status indicators 1204-1208 can be activated (which causes a state of at least one of the status indicators 1204-1208 to alter). Once the counter 1218 reaches a particular value, a contact 1226 can be closed, and a status indicator 1228 can be activated, thereby altering state of at least one of the status indicators 1204-1208. Thus, it can be discerned that the push button 1210, the status indicators 1214, 1224, and 1228, and the counters 1218 and 1222 are HMI logic, and are embedded directly within control logic (ladder logic) which can be executed by a logic controller.

Figure 13:
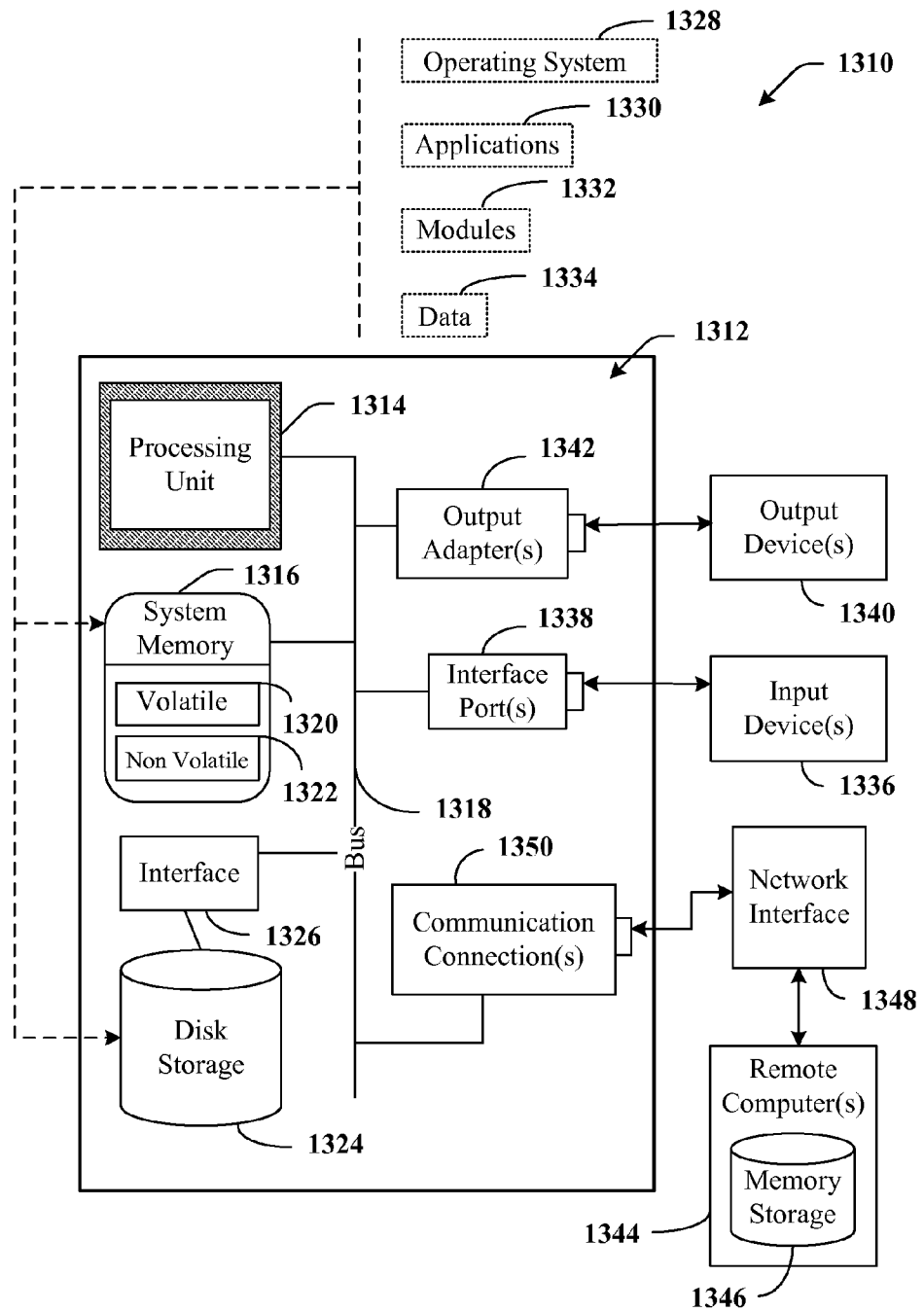
FIG. 13 is an example computing environment.

With reference to FIG. 13, an example environment 1310 for implementing various aspects of the aforementioned subject matter, including embedding HMI logic directly within control logic, includes a computer 1312. The computer 1312 includes a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314.

The system bus 1318 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1316 includes volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable PROM (EEPROM), or flash memory. Volatile memory 1320 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1312 also includes removable/non-removable, volatile/non-volatile computer storage media. FIG. 13 illustrates, for example a disk storage 1324. Disk storage 1324 includes, but is not limited to, devices like a magnetic disk drive, floppy disk drive, tape drive, Jaz drive, Zip drive, LS-100 drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to the system bus 1318, a removable or non-removable interface is typically used such as interface 1326.

It is to be appreciated that FIG. 13 describes software that acts as an intermediary between users and the basic computer resources described in suitable operating environment 1310. Such software includes an operating system 1328. Operating system 1328, which can be stored on disk storage 1324, acts to control and allocate resources of the computer system 1312. System applications 1330 take advantage of the management of resources by operating system 1328 through program modules 1332 and program data 1334 stored either in system memory 1316 or on disk storage 1324. It is to be appreciated that the subject invention can be implemented with various operating systems or combinations of operating systems.

A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port may be used to provide input to computer 1312, and to output information from computer 1312 to an output device 1340. Output adapter 1342 is provided to illustrate that there are some output devices 1340 like monitors, speakers, and printers, among other output devices 1340, which require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1350 refers to the hardware/software employed to connect the network interface 1348 to the bus 1318. While communication connection 1350 is shown for illustrative clarity inside computer 1312, it can also be external to computer 1312. The hardware/software necessary for connection to the network interface 1348 includes, for exemplary purposes only, internal and external technologies such as, modems including regular telephone grade modems, cable modems and DSL modems, ISDN adapters, and Ethernet cards.

Figure 14:
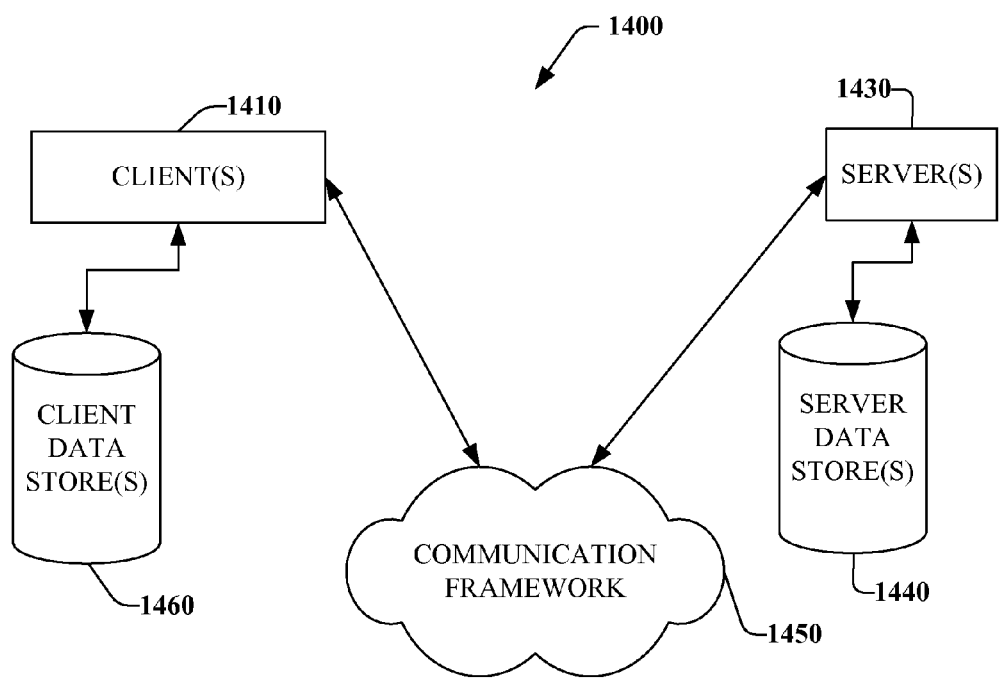
FIG. 14 is an example networking environment.

FIG. 14 is a schematic block diagram of a sample-computing environment 1400 with which the disclosed subject matter can interact. The system 1400 includes one or more client(s) 1410. The client(s) 1410 can be hardware and/or software (e.g., threads, processes, computing devices). The system 1400 also includes one or more server(s) 1430. The server(s) 1430 can also be hardware and/or software (e.g., threads, processes, computing devices). The servers 1430 can house threads to perform transformations by employing the subject invention, for example. One possible communication between a client 1410 and a server 1430 can be in the form of a data packet adapted to be transmitted between two or more computer processes. The system 1400 includes a communication framework 1450 that can be employed to facilitate communications between the client(s) 1410 and the server(s) 1430. The client(s) 1410 are operably connected to one or more client data store(s) 1460 that can be employed to store information local to the client(s) 1410. Similarly, the server(s) 1430 are operably connected to one or more server data store(s) 1440 that can be employed to store information local to the servers 1430.

What has been described above includes examples of the claimed subject matter. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
   a processor communicatively coupled to a memory for utilization with a controller, the controller comprising an interface component that receives a request to embed human-machine interface (HMI) logic into control logic;
   an analyzer component coupled to the processor that automatically determines how the HMI logic is wired up with respect to other HMI logic; and
   an embedder component coupled to the processor that executes the request and embeds the HMI logic into the control logic, the embedder component embeds the HMI logic into the control logic based at least in part upon the determination made by the analyzer component.

2. The system of claim 1, the embedder component embeds the HMI logic without defining tags with respect to the HMI logic.

3. The system of claim 1, further comprising a storing component that stores the HMI logic into a library that is accessible by multiple programmers.

4. The system of claim 1, the control logic is ladder logic.

5. The system of claim 1, further comprising an access component that enables a programmer to review a library of HMI logic and select the HMI logic that is desirably embedded within the control logic.

6. The system of claim 1, further comprising a security component that authenticates an identity of an initiator of the request and determines whether the initiator of the request is authorized to embed the HMI logic into the control logic.

7. The system of claim 6, the security component analyzes one or more of a username, password, personal identification number, and biometric indicia in connection with authenticating the identity of the initiator of the request.

8. The system of claim 1, further comprising an editor component that enables the HMI logic to be edited prior to the HMI logic being embedded within the control logic.

9. The system of claim 8, further comprising a storing component that stores the edited HMI logic in a data store that is accessible by a plurality of programmers.

10. The system of claim 9, the data store is accessible to the plurality of programmers by way of the Internet.

11. The system of claim 1, further comprising a replicator component that enables the HMI logic to be replicated in a plurality of logic controllers.

12. A combined controller and HMI comprising the system of claim 1.

13. The system of claim 1, further comprising an execution component configured to execute a series of events within a data-driven architecture.

14. A method for embedding human-machine interface (HMI) logic into control logic, comprising:
- receiving a request to embed HMI logic into control logic;
- automatically analyzing how the HMI logic is wired with respect to other logic; and
- embedding the HMI logic into the control logic according to the request and based at least in part upon the analysis.

15. The method of claim 14, further comprising executing the embedded HMI logic within a logic controller.

16. The method of claim 14, further comprising:
- authenticating an identity of an initiator of the request; and
- determining whether the initiator of the request is authorized to initiate the request based upon the identity.

17. A system comprising:
- means for receiving, at a processor communicatively coupled to a memory, a request to embed human-machine interface (HMI) logic into control logic;
- means for automatically determining how the HMI logic is wired to other logic; and
- means for embedding by the processor the HMI logic into the control logic according to the request and based at least in part upon the determined wiring.

* * * * *

UNITED STATES PATENT AND TRADEMARK OFFICE
CERTIFICATE OF CORRECTION

PATENT NO. : 7,657,329 B1  Page 1 of 1
APPLICATION NO. : 11/467818
DATED : February 2, 2010
INVENTOR(S) : Robert F. Lloyd It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 449 days.

Signed and Sealed this

Thirtieth Day of November, 2010

David J. Kappos
*Director of the United States Patent and Trademark Office*